(12) United States Patent
Hoffman

(10) Patent No.: US 12,055,917 B2
(45) Date of Patent: Aug. 6, 2024

(54) DISTRIBUTED DYNAMIC MODEL FOR MULTI-AXIS MOTION CONTROL

(71) Applicant: Rockwell Automation Technologies, Inc., Mayfield Heights, OH (US)

(72) Inventor: Jonathan D. Hoffman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 51 days.

(21) Appl. No.: 17/955,105

(22) Filed: Sep. 28, 2022

(65) Prior Publication Data

US 2024/0103490 A1 Mar. 28, 2024

(51) Int. Cl.
*G05B 19/414* (2006.01)
*G05B 19/40* (2006.01)

(52) U.S. Cl.
CPC ......... *G05B 19/4141* (2013.01); *G05B 19/40* (2013.01)

(58) Field of Classification Search
CPC ............................ G05B 19/4141; G05B 19/40
USPC ................................................ 318/689, 560
See application file for complete search history.

(56) References Cited

U.S. PATENT DOCUMENTS 6,249,102 B1 * 6/2001 Brakelmann ...... G05B 19/4141
318/567

OTHER PUBLICATIONS

Bohner, et al., "A Multi-Agent Approach with Distributed Fuzzy Logic Control," Computers in Industry, ELSEVIER, vol. 26, No. 3, Aug. 1, 1995, (pp. 219-227).
Di Napoli, et al., "A novel control strategy for youBot arm," IECON 2016—42nd annual Conference of the IEEE Industrial Electronics Society, IEEE, Oct. 23, 2016, (pp. 482-487).
Extended European Search Report for Application No. 23198471.7 dated Jun. 18, 2024 (16 pages).
Hu, et al., "Recursive decentralized control for robotic manipulators," Aerospace Science and Technology, ELSEVIER, vol. 76, Feb. 19, 2018, (pp. 374-385).
MingChao, et al., "Distributed Adaptive Sliding Mode Control of Modular and Reconfigurable Robots," 2007 IEEE International Conference on Automation and Logistics, IEEE, Aug. 18, 2007, (pp. 1252-1257).
Siciliano, et al., "Chapters 4 and 8 ED—Bruno Siciliano; Sciavicco L; Villani L; Oriolo G", Robotics: Modelling, Planning and Control, Jan. 1, 2009, (pp. 309-323).

(Continued)

*Primary Examiner* — David Luo
(74) *Attorney, Agent, or Firm* — Boyle Fredrickson, S.C.

(57) ABSTRACT

A system for distributed multi-axis motion control includes a controller having a memory configured to store a control program and a processor configured to execute the control program. A desired motion trajectory is determined for a multi-axis system having multiple axes, and an axis command is generated for each of the axes as a function of the desired motion trajectory. The system also includes multiple motors and multiple motor drives. Each of the motors corresponds to one axis for the multi-axis system, and each of the motor drives controls at least one of the motors responsive to receiving the axis command for the corresponding motor. Each of the motor drives also determines a motion state for a link driven by the motor as a function of the axis command and transmits at least a portion of the motion state to another motor drive controlling another axis.

20 Claims, 9 Drawing Sheets

(56) References Cited

OTHER PUBLICATIONS

Steinegger, et al., "A framework for modular and distributable control of reconfigurable robotic systems," 2016 IEEE International Conference on Industrial Technology (ICIT), IEEE, Mar. 14, 2016, (pp. 848-853).
Su, et al., Recursive Decentralized Control for Trajectory Tracking of Flexible Space Manipulators,: IEEE Access, vol. 7, Mar. 21, 2019, (pp. 39192-39206).
Zhang, et al., "A Control System Design for 7-DoF Light-Weight Robot Based on EtherCAT Bus," 2018 IEEE International Conference on Mechatronics and Automation (Icma), IEEE, Aug. 5, 2018, (pp. 2169-2174).

\* cited by examiner

DISTRIBUTED DYNAMIC MODEL FOR MULTI-AXIS MOTION CONTROL

BACKGROUND INFORMATION

The subject matter disclosed herein relates to distributing a dynamic model for multi-axis motion control between motor drives controlling each axis. More specifically, a motor drive controlling one axis provides information on the operation of the axis it controls to another motor drive, where the other motor drive controls an adjacent axis in the multi-axis motion control system and the other motor drive compensates operation of the adjacent axis to reduce coupling forces between axes.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The rectifier section may be a passive rectifier with diodes converting the AC voltage to a DC voltage, or the rectifier section may be an active front end with power electronic switching devices, such as insulated gate bipolar transistors (IGBTs), thyristors, or silicon-controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to convert the AC voltage to a desired DC voltage on the DC. An inverter section is supplied between the DC bus and an output of the motor drive to convert the DC voltage on the DC bus back to an AC voltage having a variable amplitude and frequency to control rotation of the motor. The inverter section includes power electronic switching devices and receives switching signals to selectively turn on and off each switching device to obtain the desired AC voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude and/or frequency of the output voltage is varied. The motor controller utilizes modulation techniques such as pulse width modulation (PWM) to control the switching and to synthesize waveforms having desired amplitudes and frequencies.

As is also known in the art, control of a motor by a motor drive is often impacted by multiple unknown variables. External disturbances or interaction between devices may impact performance. In multi-axis applications, a controlled machine or process includes multiple axes having coupling between different axes. At least one motor is required to control operation of each axis, and operation of one motor impacts operation of another motor. One example of multi-axis control is a robot. A motion trajectory for the robot is typically defined in terms of a path of travel for an end effector for the robot. In other words, motion of the robot is defined based on a desired path of the tool, the gripper, or other device connected at the end of the robot. The desired path may be a straight line or a curvilinear path in two or three dimensions between a starting point and an ending point. To obtain the desired path, each joint of the robot is independently controlled such that the net effect of the robot's motion is to have the end effector follow the desired path.

Each joint of the robot includes an axis of motion. The axis of motion is defined by a motor and a motor drive to control the motor. The joint further includes a gearbox or other mechanical coupling between an output shaft of the motor and a mechanical link for the robot, where each mechanical link spans between two joints. A first axis of motion for the robot is connected to a base for the robot. The base may be the ground, a mounting plate, or other surface providing a rigid, stationary connection to which the robot is mounted. A first motor and a first motor controller are provided to control the first axis of motion. Additional motors and motor controllers are configured to control each intermediate axis of motion for the robot. A final motor and motor controller are used to control a tool, a gripper, or other end effector of the robot. Motion of one joint will cause each subsequent joint in the robot to move. Motion, for example on the first joint may be rotational and will cause each of the joints to rotate in space about the axis of rotation of the first joint. Motion on the final joint before the end effector will only affect the position of the end effector. The force applied to any joint will, however, cause each joint in the robot to experience a disturbance as a result of the mechanical linkage between joints. Thus, operation of each axis will have some impact on operation of each other axis in the multi-axis system.

Historically, it has been known to provide a dedicated computation device to determine motion commands for each axis. The dedicated computation device includes a complex dynamic model for the robot, which may include cross-coupling terms between axes to help compensate for inter-action between motors. This dynamic model, however, includes complex mathematical computations requiring substantial processing capabilities and, consequently, the need for the dedicated computation device. The dedicated computation device determines a torque command for each joint as a result of the desired motion trajectory for the end effector and transmits the torque command to each motor drive.

Implementation of the dedicated computation device is not without certain drawbacks. The dedicated computation device adds cost and complexity to the control system. Use of the dedicated computation device results in reduced performance of the control system when compared to a traditional servo controller. The dedicated computation device transmits open-loop torque commands to each motor drive. The open-loop torque command, however, rely on the accuracy of the dynamic model and on the accuracy of the torque command to achieve a desired angular position of the motor. These open-loop commands are sensitive to errors in the dynamic model and/or drift in operating parameters of the robot over time where the drift is not included in the dynamic model. The open-loop torque commands may be supplemented by a position loop closed in the dedicated computation device on each axis, however, the update rate on the position loop is necessarily limited. Position feedback information is generated within the motor drive and, in turn, transmitted back up to the dedicated computation device either from the motor drive or via the industrial controller. The feedback delay requires a low bandwidth in the position loop to retain stability of the closed loop. In contrast, a traditional servo controller closes a position loop at an update rate that may be an order of magnitude faster than the update rate of the dedicated computation device.

Thus, it would be desirable to provide an improved system and method for controlling operation of motors in a multi-axis motion control application.

BRIEF DESCRIPTION

According to one embodiment of the invention, a system for distributed multi-axis motion control includes a controller, multiple motors, and multiple motor drives. The controller has a memory configured to store a control program and a processor. The processor is configured to execute the control program to determine a desired motion trajectory for a multi-axis system having multiple axes and to generate an axis command for each axis as a function of the desired motion trajectory. Each of the motors corresponds to one axis for the multi-axis system, and each motor drive controls at least one of the motors responsive to receiving the axis command for the corresponding motor. Each motor drive determines a first motion state for a first link driven by the corresponding motor as a function of the axis command and of a portion of a second motion state for an adjacent axis. Each motor drive transmits at least a portion of the first motion state to another of the plurality of motor drives controlling the adjacent axis.

According to another embodiment of the invention, a method for distributed multi-axis motion control includes determining multiple axis commands within a controller as a function of a desired motion trajectory for a multi-axis system. At least one of the axis commands is transmitted to one of multiple motor drives, and each motor drive controls operation of a motor for an axis corresponding to the axis command. A motion state is determined for a link controlled by a first motor drive as a function of a first axis command received by the first motor drive. At least a portion of the motion state from the first motor drive is transmitted to a second motor drive, and operation of the axis corresponding to the second motor drive is controlled as a function of a second axis command received by the second motor drive and as a function of the portion of the motion state received from the first motor drive.

According to still another embodiment of the invention, a method for distributed multi-axis motion control includes determining multiple axis commands within a controller as a function of a desired motion trajectory for a multi-axis system. A velocity matrix and an acceleration matrix are determined at each axis as a function of the axis commands. A wrench matrix is determined in a second motor drive for a first motor drive and transmitted from the second motor drive to the first motor drive. Operation of a first motor is controlled with the first motor drive as a function of the axis command for an axis controlled by the first motor and as a function of the wrench matrix received from the second motor drive.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
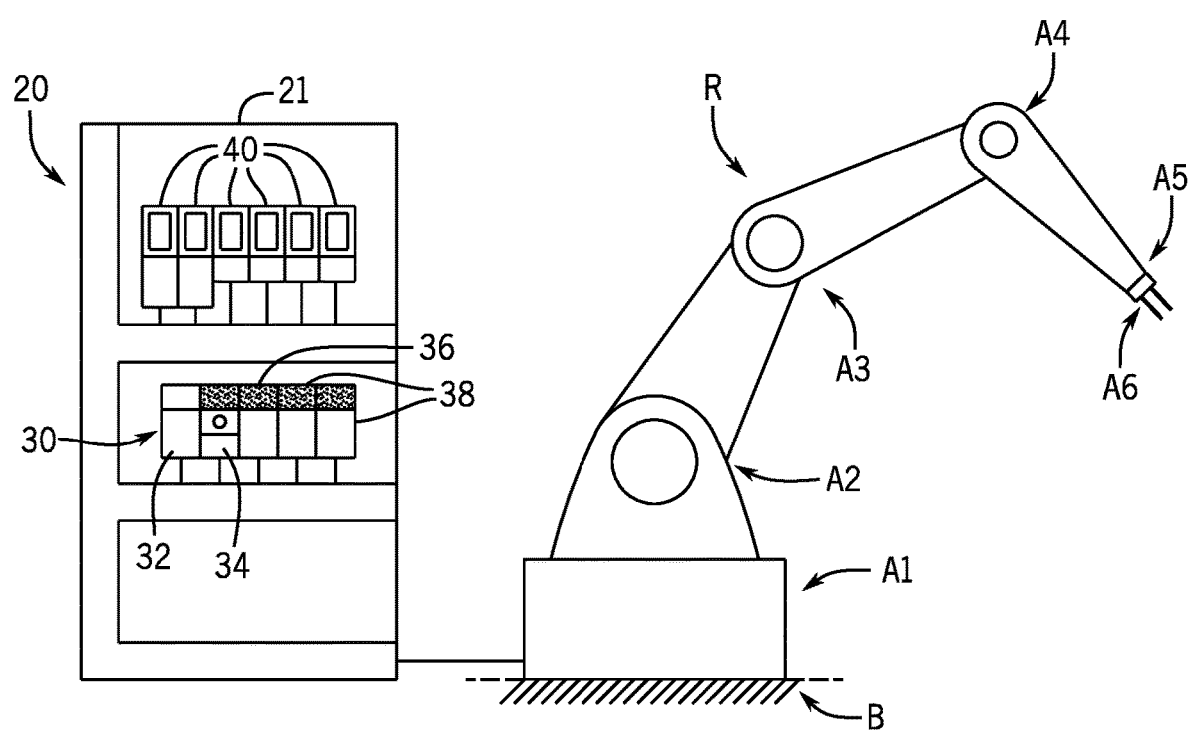
FIG. 1 is an exemplary environmental view of a robot and control system incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system and method for controlling operation of motors in a multi-axis motion control application. An industrial controller receives a kinematic model for operation of the multi-axis system. The industrial controller further receives configuration information for each axis and for the mechanical linkage between each axis. The configuration information includes, for example, an orientation of a joint, a length and mass of a mechanical linkage between joints, and the type of motion performed by each joint. The industrial controller parses the kinematic model into separate configuration matrices for each axis, where each configuration matrix includes positional relationships between the axis, the joint, and the mechanical linkage, as well as the configuration parameters relating to a link controlled by the axis. The industrial controller then passes the separate configuration matrices to a motor drive controlling the respective axis. The motor drive for each axis determines velocity and acceleration matrices associated with the link controlled by the axis and also determines a torque and force matrix associated with cross-coupling between links. Each matrix includes multi-dimensional values for an x-axis, a y-axis, a z-axis and the corresponding rotational axes. Each motor drive is then in communication with the motor drive for adjacent axes to pass the velocity and acceleration matrices forward to an adjacent axis and to pass the torque and force matrices backward to the other adjacent axis. Each motor drive executes a dynamics module to determine a torque required at the corresponding motor to achieve desired operation of the motor. The dynamics module uses the configuration matrix received from the industrial controller, the motion command received from the industrial controller, the velocity and acceleration matrices received from one adjacent motor drive, and the torque and force matrix received from another adjacent motor drive to determine a dynamic torque value for the motor. Each motor drive then controls operation of their respective axis as a function of the motion commands received from the industrial controller and of the dynamic torque value determined by the dynamics module.

Figure 2:
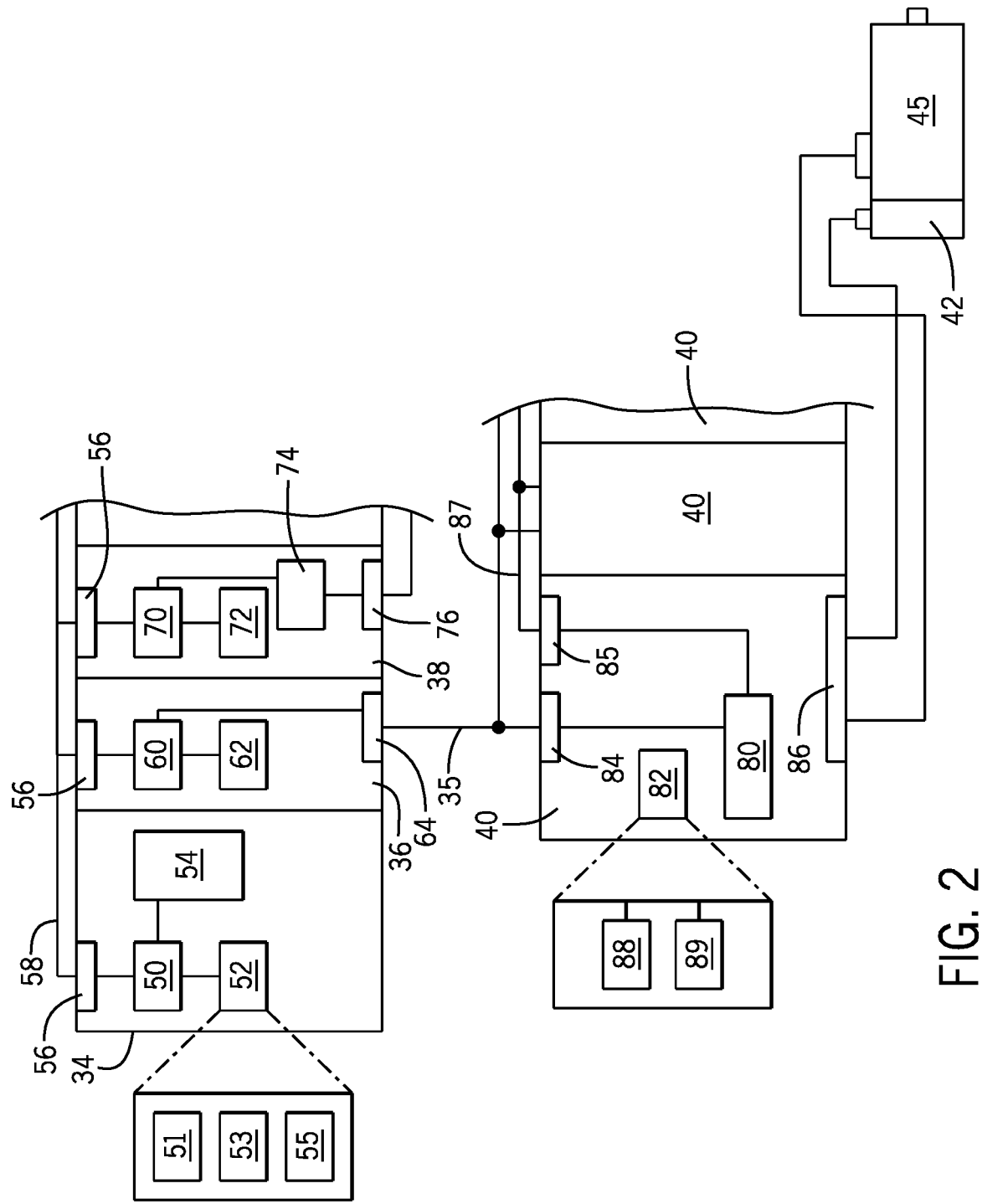
FIG. 2 is a schematic representation of a portion of the control system for the robot and controller of FIG. 1.

Referring initially to FIGS. 1 and 2, an industrial control system 20 may include an industrial controller 30 made up of multiple modules. The industrial controller 30 is configurable and may include, for example, a power supply module 32, a processor module 34, a network module 36, and various additional modules 38 according to an application's requirements. The network module 36, processor module 34, or a combination thereof may communicate on an industrial control network 35, such as ControlNet®, DeviceNet®, or EtherNet/IP®, between the industrial controller 30 and other devices connected to the industrial controller. The industrial controller 30 may be, for example, a programmable logic controller (PLC), a programmable automation controller (PAC), or the like. It is contemplated that the industrial controller 30 may include still other modules, such as a motion control module, one or more axis control modules, or additional racks connected via the industrial control network 35. Optionally, the industrial controller 30 may have a fixed configuration, for example, with a predefined number of network and I/O connections.

The industrial control network 35 may join the industrial controller 30 to remote I/O modules (not shown) and one or more motor drives 40, the latter of which may communicate with corresponding electric motors 45 and position sensors 42 to provide for controlled motion of the electric motors 45. The controlled motion of the electric motors, in turn, controls associated industrial machinery or processes. While a single motor drive 40 and motor 45 may be referred to as an axis of motion, an axis of motion may also require multiple motors controlled by a single motor drive or multiple motor drives and multiple motors operating in tandem. In still other applications, a single motor drive may control multiple motors where each motor may be a separate axis of motion. The network 35 may also join with other devices in the controlled machine or process, including, for example, actuators, which may be controlled by output signals from the industrial controller 30, or sensors, which may provide input signals to the industrial controller.

According to the illustrated embodiment, the industrial control system 20 is configured to control a robot, R. The robot, R, is illustrated with six axes of motion, A1-A6. The number of axes and configuration of the robot is intended to be exemplary and not limiting. Although illustrated as a robot, R, with an arm and gripper connected to an end of the arm, it is contemplated that the robot, R, my include a tool changer to provide alternate tools to an end effector on the arm or the robot may be of alternate configurations, such as a delta robot with multiple arms used to position an end effector. The illustrated robot is mounted on a base, B, which for this example is the ground. The robot, R, includes a first axis, A1, mounted on the base and used to rotate the robot, R, around a vertical axis. The robot includes three additional axes (A2, A3, and A4) which each pivot one segment of the arm for the robot around a horizontal axis. A fifth axis, A5, is used to rotate the gripper, and a sixth axis, A6, is used to open and close the gripper. Each axis A1-A6 includes a separate motor drive 40 within a control cabinet 21 to control operation of the respective axis.

Referring next to FIG. 2, the processor module 34 includes a processor 50 communicating with a memory device 52 to execute an operating system program 51, generally controlling the operation of the processor module 34, and a control program 53, describing a desired control of the robot, R, and or any other industrial machine or process interacting with the robot, where each control program is typically unique to a given application of the industrial control system 20. The memory 52 may also include data tables and/or a kinematic model 55 of the robot, R, as used by the control program. The kinematic model 55 may be prepared offline in a separate computing device and downloaded into the industrial controller 30. Optionally, a user interface may be provided between the industrial controller 30 and a technician by which the kinematic model 55 is entered. The processor module 34 may communicate with other modules 36, 38 of the industrial controller 30 via a backplane 58 extending between backplane connectors 56.

The network module 36 includes a control circuit, which may include a microprocessor 60 and a program stored in memory 62 and/or dedicated control circuitry such as an application specific integrated circuit (ASIC) or field programmable gate array (FPGA). The control circuit may communicate with a network interface circuit 64 within the network module 36, where the network interface circuit 64 provides for execution of low-level electrical protocols on the industrial control network 35. Similar network interface circuits 84 may be provided on other devices, such as the motor drives 40, to provide communication between devices.

Each additional module 38 includes components according to the desired function of the module. Many additional modules 38 will include a processor 70 and memory 72, where the processor 70 is configured to execute instructions stored on the memory. Terminals 76 or ports provide a connection to devices external from the additional module 38 and control logic circuitry 74 is provided between the terminals 76 or ports and the processor 70 to receive signals from external devices and process the external signals for delivery to the processor 70. Similarly, the control logic circuitry 74 may receive output signals from the processor 70, process the output signals for delivery to external devices, and deliver the processed signals to the terminals 76 or ports on the module. The control logic circuit 74 may include, but is not limited to, buffers, analog-to-digital converters, digital-to-analog converters, voltage regulators, amplifier circuits, and the like.

Each motor drive 40 includes a controller 80 in communication with a memory device 82. The controller 80 may be implemented, for example, in a microprocessor, application specific integrated circuit (ASIC), field programmable gate array (FPGA), or other such customizable device. The memory device 82 may include transitory memory, non-transitory memory, persistent memory, or non-persistent memory, or a combination thereof. The memory device 82 may be configured to store data and programs, which include a series of instructions executable by the controller 80. It is contemplated that the memory device 82 may be a single device, multiple devices, or incorporated, for example, as a portion of another device such as an application specific integrated circuit (ASIC). The controller 80 is in communication with the memory 82 to read the instructions and data as required to control operation of the motor drive 40. The memory 82 stores configuration parameters 88 defining desired operation of the motor drive 40 and the configuration matrix 89, which includes the portion of the robotic kinematic model corresponding to an axis of motion controlled by the motor drive. The motor drive includes terminals 86 configured to supply voltage to the motor 45 and to receive position feedback signals from the encoder 42 mounted on the motor. According to the illustrated embodiment, a dedicated inter-module communication interface 85 and communication cable 87 is connected between each motor drive 40. According to one aspect of the invention, each motor drive 40 includes an output port and an input port with a pluggable connector configured to connect between the output port of one motor drive 40 and the input port of an adjacent motor drive. According to another aspect of the invention, the industrial network 35 may have sufficient bandwidth to handle the required inter-module communications. The inter-module communication interface 85 may be the interface circuit 84 for the industrial network 35 and the communication cable 87 may be a network cable for the industrial network.

Figure 3:
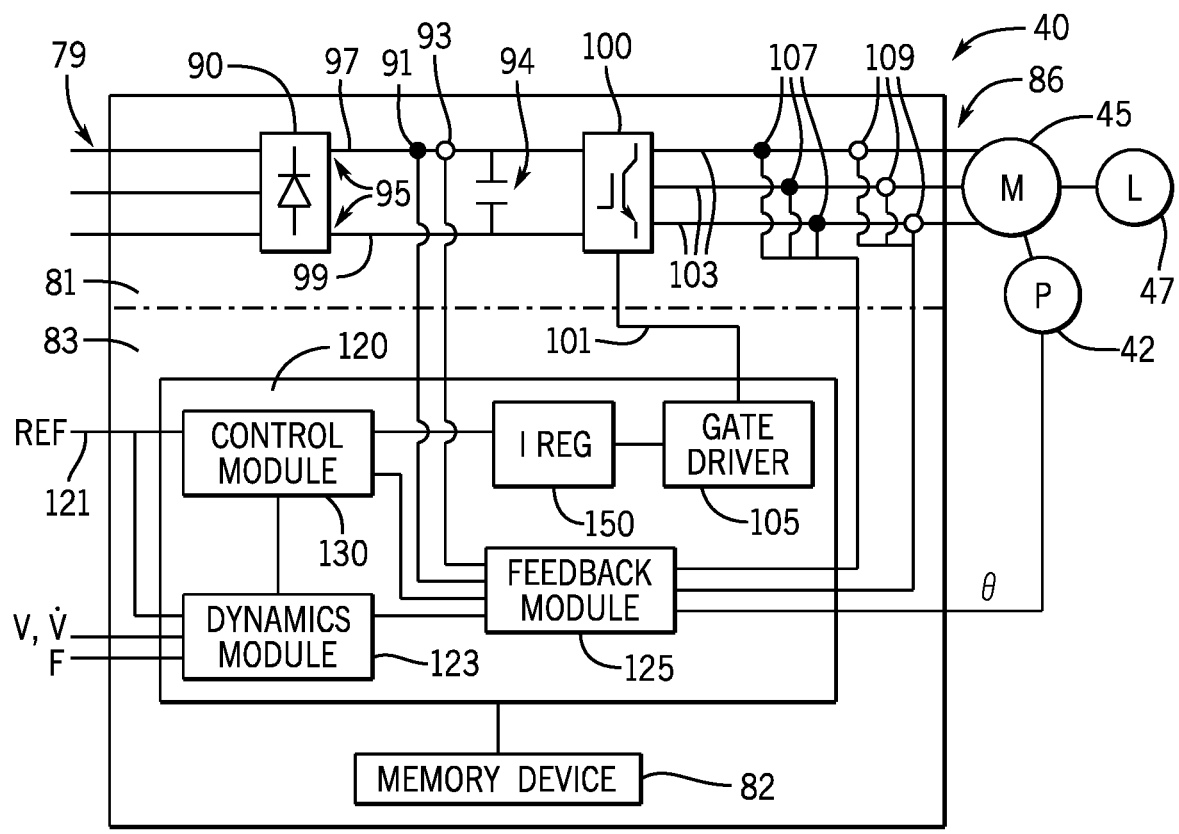
FIG. 3 is a block diagram representation of one motor drive of FIG. 2.

Turning next to FIG. 3, a motor drive 40, according to one embodiment of the invention, includes a power section 81 and a control section 83. The power section 81 includes components typically handling, for example, 200-575 VAC or 200-800 VDC, and the power section 81 receives power in one form and utilizes power switching devices to regulate power output to the motor 45 in a controlled manner to achieve desired operation of the motor 45. The control section 83 includes components typically handling, for example 110 VAC or 3.3-48 VDC and, the control section 83 includes processing devices, feedback circuits, and supporting logic circuits to receive feedback signals and generate control signals within the motor drive 40.

Figure 4:
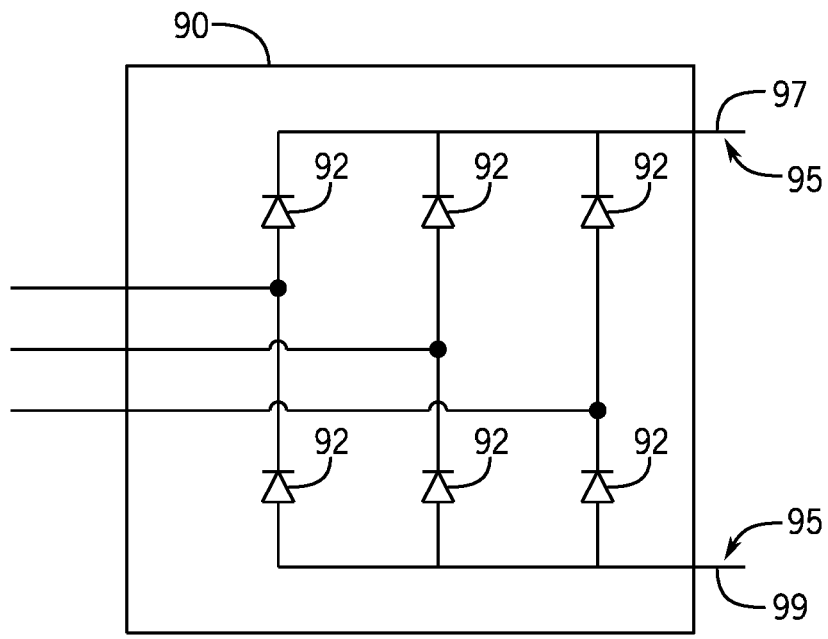
FIG. 4 is a schematic representation of a rectifier section for the motor drive of FIG. 3.

According to the illustrated embodiment, the motor drive 40 is configured to receive a three-phase AC voltage at an input 79 of the motor drive 40 which is, in turn, provided to a rectifier section 90 of the motor drive 40. The rectifier section 90 may include any electronic device suitable for passive or active rectification as is understood in the art. With reference also to FIG. 4, the illustrated rectifier section 90 includes a set of diodes 92 forming a diode bridge that rectifies the three-phase AC voltage to a DC voltage on the DC bus 95. Optionally, the rectifier section 90 may include other solid-state devices including, but not limited to, thyristors, silicon-controlled rectifiers (SCRs), or transistors to convert the input power 79 to a DC voltage for the DC bus 95. The DC voltage is present between a positive rail 97 and a negative rail 99 of the DC bus 95. A DC bus capacitor 94 is connected between the positive and negative rails, 97 and 99, to reduce the magnitude of the ripple voltage resulting from converting the AC voltage to a DC voltage. It is understood that the DC bus capacitor 94 may be a single capacitor or multiple capacitors connected in parallel, in series, or a combination thereof. The magnitude of the DC voltage between the negative and positive rails, 99 and 97, is generally equal to the magnitude of the peak of the AC input voltage.

Figure 5:
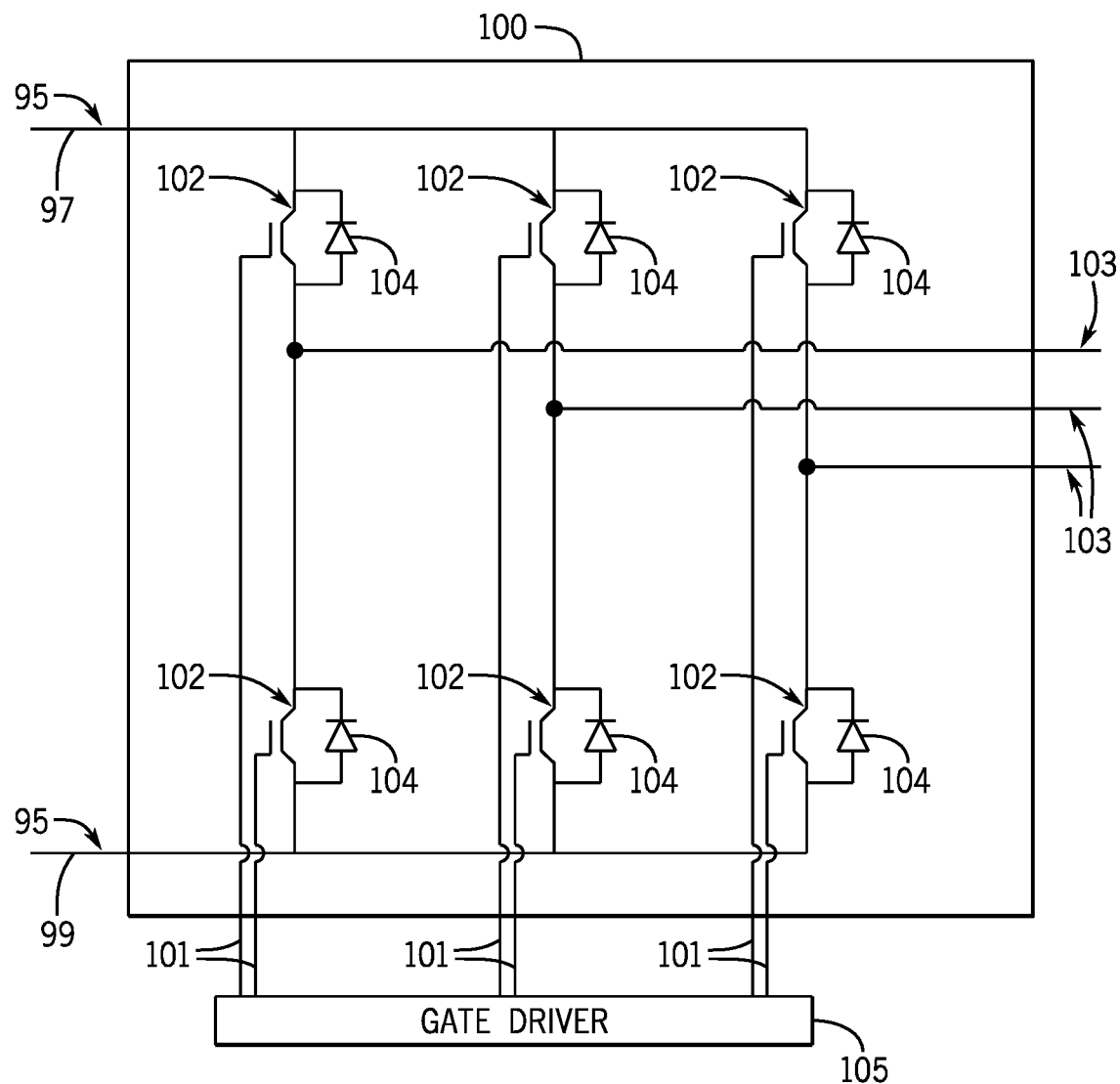
FIG. 5 is a schematic representation of an inverter section for the motor drive of FIG. 3.

The DC bus 95 is connected in series between the rectifier section 90 and an inverter section 100. Referring also to FIG. 5, the inverter section 100 consists of switching elements, such as transistors, thyristors, or SCRs as is known in the art. The illustrated inverter section 100 includes an insulated gate bipolar transistor (IGBT) 102 and a free-wheeling diode 104 connected in pairs between the positive rail 97 and each phase of the output voltage as well as between the negative rail 99 and each phase of the output voltage. Each of the IGBTs 102 receives gating signals 101 to selectively enable the transistors 102 and to convert the DC voltage from the DC bus 95 into a controlled three phase output voltage to the motor 45. When enabled, each transistor 102 connects the respective rail 97, 99 of the DC bus 95 to an electrical conductor 103 connected between the transistor 102 and the output terminal 86. The electrical conductor 103 is selected according to the application requirements (e.g., the rating of the motor drive 40) and may be, for example, a conductive surface on a circuit board to which the transistors 102 are mounted or a bus bar connected to a terminal from a power module in which the transistors 102 are contained. The output terminals 86 of the motor drive 40 may be connected to the motor 45 via a cable including electrical conductors connected to each of the output terminals 86.

Figure 11:
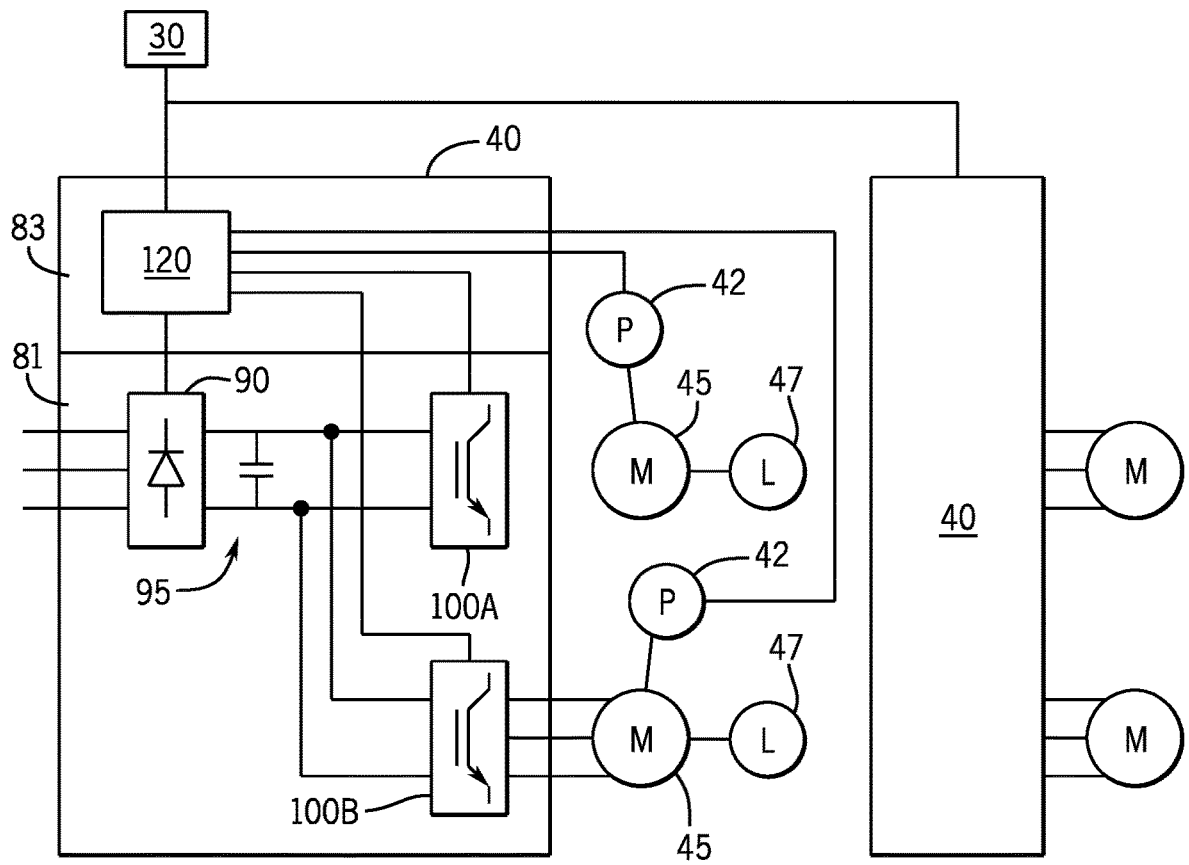
FIG. 11 is a block diagram representation of a motor drive controlling multiple motors in the control system of FIG. 1.

With reference also to FIG. 11, in some embodiments of the invention, one motor drive 40 may be configured to control operation of two motors 45. The motor drive 40 includes a control section 83 and a power section 81 similar to that described above for a motor drive 40 configured to control a single motor. However, the power section 81 includes two inverter sections 100A, 100B. Each inverter section receives the DC voltage from the DC bus 95 and converts the DC voltage to a controlled three phase output voltage to a respective motor 45. The rectifier section 90 includes components rated to transfer sufficient power to the DC bus 95 to supply both inverter sections 100A, 100B. Each inverter section 100A, 100B draws the power needed from the DC bus 95 for desired operation of the respective motor 45.

One or more modules are used to control operation of the motor drive 40. Referring again to the embodiment illustrated in FIG. 3, a controller 120 includes the modules and manages execution of the modules. The illustrated embodiment is not intended to be limiting and it is understood that various features of each module discussed below may be executed by another module and/or various combinations of other modules may be included in the controller 120 without deviating from the scope of the invention. The modules may be stored programs executed on one or more processors 80, logic circuits, or a combination thereof.

The controller 120 receives at least one reference signal, Ref, 121 identifying desired operation of the motor 45 connected to the motor drive 40. The reference signal 121 may be, for example, a position reference ($\theta^*$), a speed reference ($\omega^*$), or a torque reference ($T^*$). For a high-performance servo control system, the reference signal 121 is commonly a position reference signal ($\theta^*$). Optionally, a motion profile or motion trajectory may include multiple reference signals, such as a position reference ($\theta^*$), a speed reference ($\omega^*$), and/or an acceleration reference ($\alpha^*$). The required reference 121 signals provided to the controller 120 vary according to an application's requirements.

The controller 120 also receives feedback signals indicating the current operation of the motor drive 40. According to the illustrated embodiment, the controller 120 includes a feedback module 125 that may include, but is not limited to, analog to digital (A/D) converters, buffers, amplifiers, and any other components that would be necessary to convert a feedback signal in a first format to a signal in a second format suitable for use by the controller 120 as would be understood in the art. The motor drive 40 may include a voltage sensor 91 and/or a current sensor 93 on the DC bus 95 generating a feedback signal corresponding to the magnitude of voltage and/or current present on the DC bus 95. The motor drive 40 may also include one or more voltage sensors 107 and/or current sensors 109 on the output phase(s) of the inverter section 100 generating a feedback signal corresponding to the magnitude of voltage and/or current present on the electrical conductors 103 between the inverter section 100 and the output 86 of the motor drive. A position feedback device 42 may be connected to the motor 45 and operable to generate a position feedback signal, $\theta$, corresponding to the angular position of the motor 45. The motor drive 40 includes an input configured to receive the position feedback signal from the position feedback device 42. It is contemplated that the input may configured to receive a sinusoidal feedback signal, a square wave, a digital pulse train, a serial communication data packet, or a combination thereof according to the configuration of the position feedback device 42.

The controller 120 utilizes the feedback signals and the reference signal 121 to control operation of the inverter section 100 to generate an output voltage having a desired magnitude and frequency for the motor 45. The feedback signals are processed by the feedback module 125 and converted, as necessary, to signals for the control module 130.

The controller 120 for the motor drive 40 also includes a dynamics module 123 configured to determine a motion state of a link associated with the controlled axis as a function of the configuration matrix 89. The dynamics module 123 is in communication with the memory 82 to read the configuration matrix 89 corresponding to the desired operation of the axis. The dynamics module 123 reads the command signal 121, feedback signals, a velocity matrix, an acceleration matrix, and a wrench matrix as needed to determine the motion state for the link. As will be discussed in more detail below, the dynamics module 123 executes to determine velocity and acceleration matrices for the link as well as a force and torque matrix for the axis controlling the link. The velocity and acceleration matrices are provided to a controller 120 for a motor drive 40 controlling an adjacent axis forward along the multi-axis system, and the force and torque matrix are provided to a controller for a motor drive controlling an adjacent axis backward along the multi-axis system. The dynamics module 123 then determines a dynamic torque value used to compensate the motor controller 40 for forces exerted on the axis by other axes in the multi-axis system.

Figure 6:
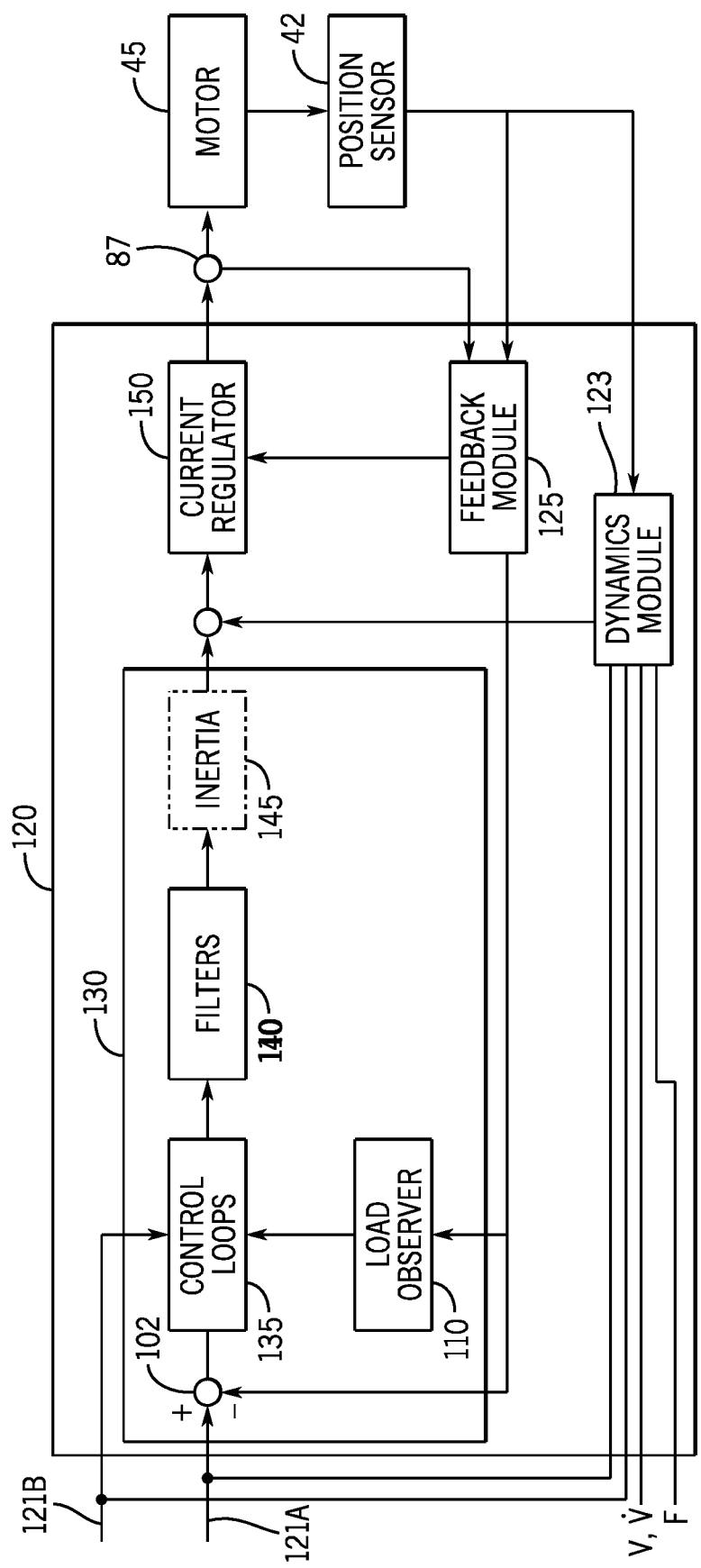
FIG. 6 is a block diagram of one embodiment of a controller for the motor drive of FIG. 3

With reference also to FIG. 6, the control module 130 includes control loops 135 and filters 140, as will be discussed in more detail below. The control loops 135 receive the command signals 121A, 121B, and a feedback signal, such as a position feedback signal, and execute responsive to the command signals and the feedback signals to generate a desired reference signal. The control module 130 may also include a load observer 110 to generate an estimated response of one or more operating characteristics of the motor 45. The estimated response may be added to the reference signal from the control loops 135 to generate a modified reference signal. One or more filters 140 may be present in the control module 130 to reduce or eliminate undesired components of the modified reference signal. The output of the filter block 140 is a filtered reference signal. As shown in FIG. 6, an optional inertia block 145 may be included in-line with the filters 140. As will be discussed in more detail below, the inertial gain may be included in the inertia block 145 or, optionally, may be incorporated into gains within the control loops 135. The filtered reference signal is provided to the inertia block which outputs a torque reference signal. The torque reference signal is, in turn, output to a summing junction at which the torque reference signal is added to the dynamic torque value and provided to the current regulator 150.

As is understood in the art, the current regulator 150 may independently regulate a torque producing component of the current and a flux producing component of the current. The torque reference signal is provided as an input to the regulator controlling the torque producing component of the current. The current regulator 150 uses the torque reference signal and a current feedback signal to output a voltage signal to a gate driver module 105. The gate driver module 105 generates the gating signals 101, for example, by pulse width modulation (PWM) or by other modulation techniques. The gating signals 101 subsequently enable/disable the transistors 102 to provide the desired output voltage to the motor 45, which, in turn, results in the desired operation of the mechanical load, L, 47 coupled to the motor 45. As is understood in the art, the current regulator 150 is configured to execute at a bandwidth sufficiently greater than the bandwidth of the control module 130 such that the current regulator 150 may be approximated as a unity gain to the control module 130.

Figure 7:
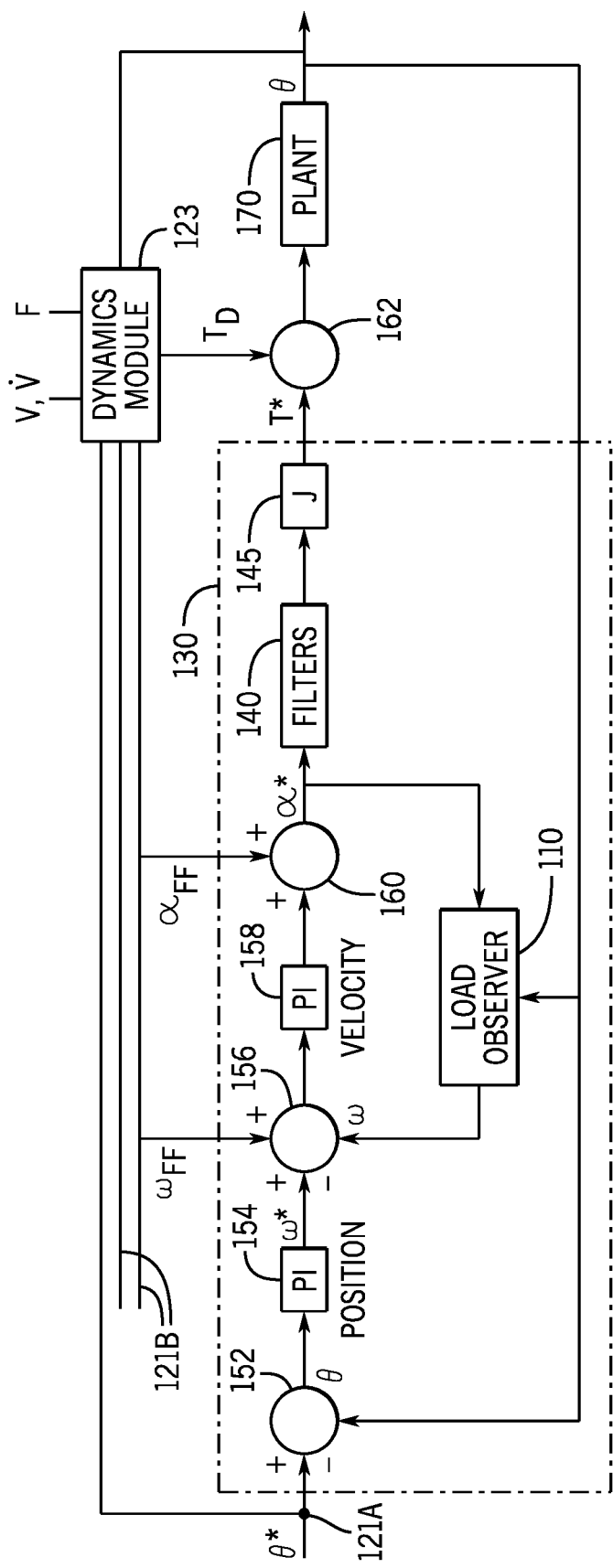
FIG. 7 is a block diagram representation of one topology for control loops within the controller of FIG. 6.

Referring next to FIG. 7, a control module 130 according to one embodiment of the invention is illustrated. The control module 130 receives a position command signal ($\theta^*$) 121A as an input. The position command signal ($\theta^*$) 121A is compared to a position feedback signal ($\theta$) at a first summing junction 152. A position error signal is output from the first summing junction 152 and input to a position loop controller 154. According to the illustrated embodiment, the position loop controller 154 includes a proportional and an integral (PI) controller. Optionally, the position loop controller 154 may be just a proportional (P) controller or further include a derivative (D) controller. Each of the proportional (P), integral (I), and/or derivative (D) controllers of the position loop controller 154 includes a controller gain value. The controller gain values are commonly referred to as a proportional gain (Kpp), integral gain (Kpi), and a derivative gain (Kpd). The output of the position loop controller 154 is a velocity reference signal ($\omega^*$).

The velocity reference signal ($\omega^*$) is compared to a velocity feedback signal ($\omega$) at a second summing junction 156. The velocity feedback signal ($\omega$) is generated by a load observer 110. Optionally, the velocity feedback signal ($\omega$) may be determined by taking a derivative of the position feedback signal ($\theta$). A velocity error signal is output from the second summing junction 156 and input to a velocity loop controller 158. According to the illustrated embodiment, the velocity loop controller 158 includes a proportional and an integral (PI) controller. Optionally, the velocity loop controller 158 may be just a proportional (P) controller or further include a derivative (D) controller. Each of the proportional (P), integral (I), and/or derivative (D) controllers of the velocity loop controller 158 includes a controller gain value. The controller gain values are commonly referred to as a proportional gain (Kvp), integral gain (Kvi), and a derivative gain (Kvd). The output of the velocity loop controller 158 is an acceleration reference signal.

The control module 130 also include feed forward branches. According to the illustrated embodiment, the control module 130 includes feed forward branches for both the velocity and the acceleration elements. The industrial controller 30 may generate motion trajectories which include a position reference ($\theta^*$), a speed reference ($\omega^*$), and an acceleration reference ($\alpha^*$). The position reference ($\theta^*$) from the motion trajectory is the position command signal ($\theta^*$) 121A. The speed reference ($\omega^*$) and the acceleration reference ($\alpha^*$) 121B from the motion trajectory are provided as feed forward terms to the control loops. The speed reference ($\omega^*$) 121B is provided as the velocity feed forward signal ($\omega FF$) and is added to the velocity reference signal and the velocity feedback signal at summing junction 106. The acceleration reference ($\alpha^*$) 121B is provided as the acceleration feed forward signal ($\alpha FF$) is added to the acceleration reference signal at a third summing junction 160.

Figure 8:
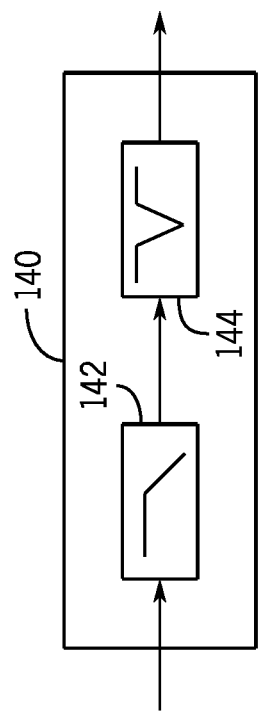
FIG. 8 is a block diagram representation of filters included in a filter block of FIG. 7.

The output of the third summing junction 160 is provided as an input to a filter section 140. The filter section 140 may include one or more filters to remove unwanted components from the control system. Referring also to FIG. 8, the illustrated filter section 140 includes a low pass filter 142 to attenuate undesirable high frequency components and a notch filter 144 to attenuate specific frequency components having an undesirable effect on the controlled mechanical load 47. It is further contemplated that additional filters may be included in the filter section 140 without deviating from the scope of the invention.

According to the embodiment illustrated in FIG. 7, the output of the filter section 140 is provided to an inertia scaling block 145, and the inertia scaling block 145 applies a gain corresponding to the inertia of the controlled system. The gain of the inertia scaling block 145 is identified simply as an inertia, J. The inertial gain may include a motor inertia value, Jm, a load inertia value, Jl, or a combination thereof. While a motor inertia value may be known, or provided by a motor manufacturer, it may be difficult to accurately identify a load inertia value. The load observer 110 may compensate for inertial gains that either do not include a load inertia or do not accurately represent the load inertia. The output of the inertia block 145 is a torque reference, T*. The torque reference is provided to a fourth summing junction 162 where it is added to the dynamic torque, $T_D$, signal.

As indicated above, the output of the control module 130 is provided to a current regulator 150 and gate driver module 105 to output a desired voltage to the motor 45. The plant 170 shown in FIG. 7 represents components of the motor 45 and motor drive 40 external to the control module 130 and may incorporate the current regulator 150, gate driver module 105, and inverter section 100 of the motor drive 40, the motor 45, the mechanical load 47, and the position feedback device 42. The position feedback device 42 generates the position feedback signal ($\theta$) used by the control module 130.

Figure 9:
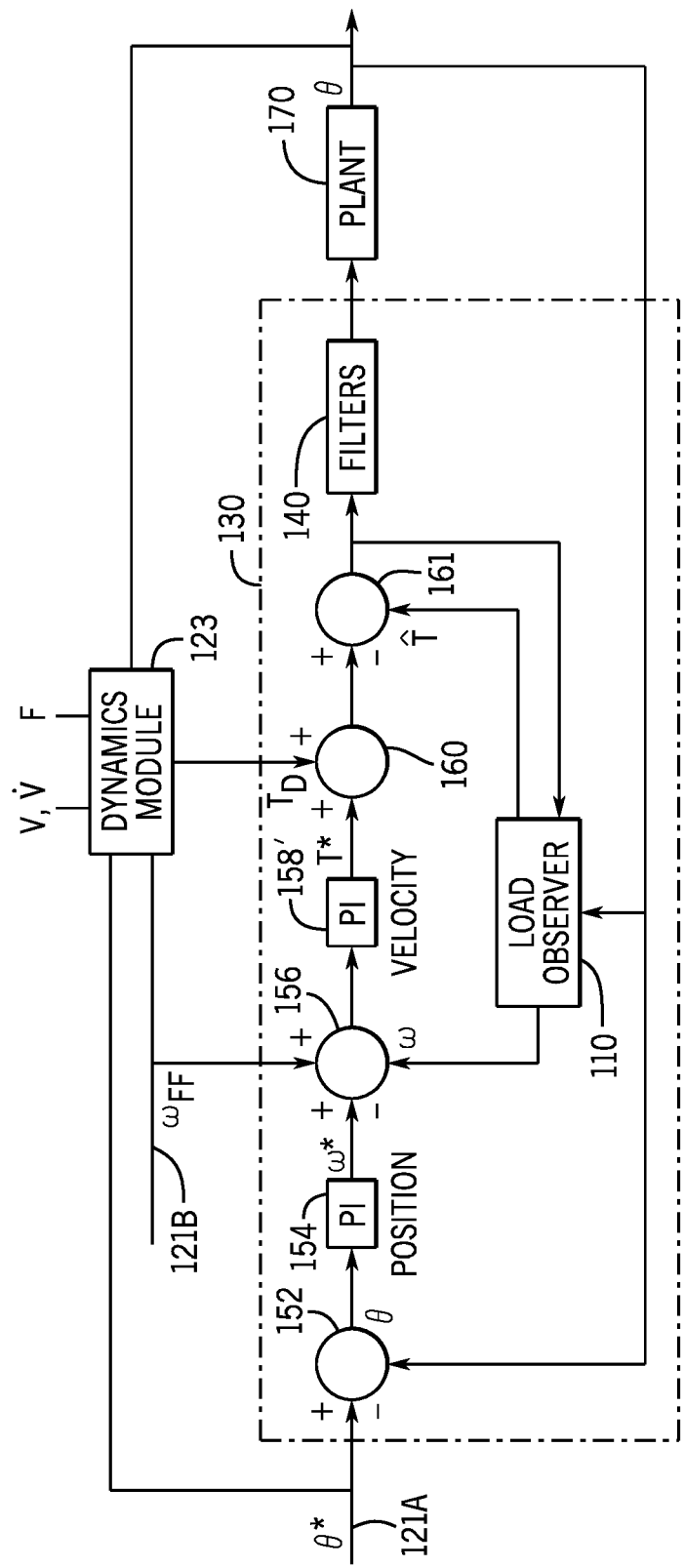
FIG. 9 is a block diagram representation of another topology for control loops within the controller of FIG. 6.

Although the reference signal from the control loops 135 is illustrated as an acceleration reference, a*, in FIG. 7, the output of the third summing junction 160 may be an acceleration or torque reference signal. With reference to FIG. 9, the inertial gains from the inertia block 145 of FIG. 7 may be incorporated into the controller gains. FIG. 9 illustrates a torque feed forward (TFF) and a modified velocity loop controller 158' indicating that the inertial gains have been incorporated within the controller gains. As is understood in the art, angular acceleration is proportional to torque and, more specifically, torque is equal to inertia times the angular acceleration. As a result, the reference signal generated by the control loops 135 in FIG. 9 is a torque reference, T*, and the estimated response generated by the load observer 110 is an estimated torque, D, applied to the motor shaft as a result of the load on the motor 45. The torque reference, T*, is added to the dynamic torque, TO, and the estimated torque, D, The summations are illustrated at a third summing junction 160 and a fourth summing junction 161, but the order of summation may be reversed or the summing junctions combined. In the illustrated embodiment, the output of the fourth summing junction 161 provides a combined reference signal, provided as an input to the filter 140. Because the inertial gains have been incorporated with the controller gains, the inertia block 145 shown in FIG. 7 is not required in the exemplary control module 130 illustrated in FIG. 9. The output of the filters 140 is a torque reference that may be provided directly to the current regulator 67.

As seen in both FIGS. 7 and 9, the dynamics module 123 generates a dynamic torque, TO, used to compensate the torque reference, T*, output from the control loops 135. Calculation of the dynamic torque will be discussed in more detail below. However, the dynamics module 123 uses the information in the configuration matrix 89 for the axis to determine a current motion state for the link being controlled by the axis, where the current motion state includes a velocity matrix, $V_i$, an acceleration matrix, $\dot{V}_i$, and a wrench matrix, $F_i$. Each matrix includes a multi-dimensional representation of the velocity, acceleration, or forces observed by each link in the robot. The velocity matrix includes a velocity in the x-axis, a velocity in the y-axis, and a velocity in the z-axis. The velocity matrix further includes an angular velocity of rotation about the x-axis, an angular velocity of rotation about the y-axis, and an angular velocity of rotation about the z-axis. The acceleration matrix includes an acceleration in the x-axis, an acceleration in the y-axis, and an acceleration in the z-axis. The acceleration matrix further includes an angular acceleration of rotation about the x-axis, an angular acceleration of rotation about the y-axis, and an angular acceleration of rotation about the z-axis. The wrench matrix includes a force observed by the link in the x-axis, a force observed by the link in the y-axis, and a force observed by the link in the z-axis. The wrench matrix further includes a torque observed as a rotational force about the x-axis, a torque observed as a rotational force about the y-axis, and a torque observed as a rotational force about the z-axis.

Figure 10:
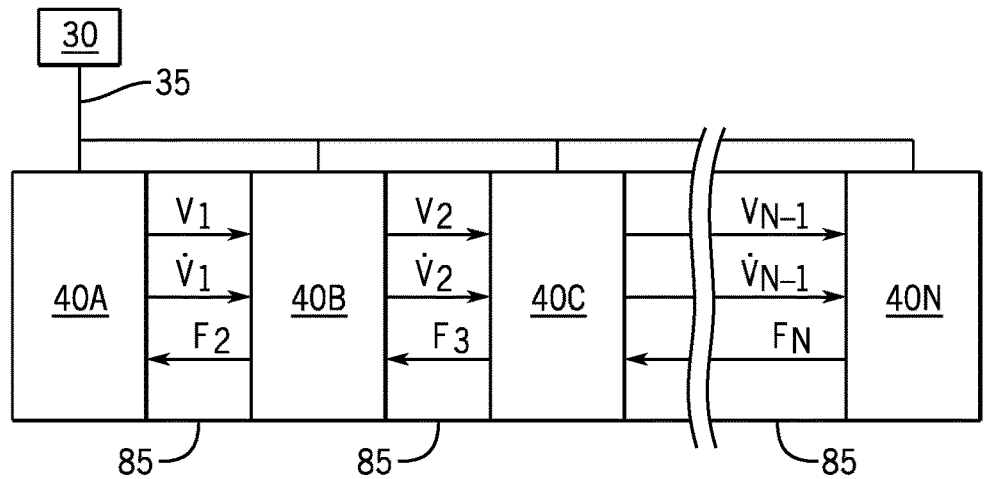
FIG. 10 is a block diagram representation of inter-module communication between motor drives in the control system of FIG. 1.

As further illustrated in FIG. 10, the motion state for each link is shared, in part, with an axis controlling a link preceding the present axis and, in part, with an axis controlling a link following the present axis. A first motor drive 40A determines the motion state for the corresponding link being controlled by the first motor drive and then transmits the first velocity matrix, $V_1$, and the first acceleration matrix, $\dot{V}_1$, to the second motor drive 40B. Because the first motor drive 40A has no preceding axis, the first wrench matrix, $F_1$, is not transferred to another motor drive. Each motor controller 40 for an intermediate axis transmits the velocity, acceleration, and wrench matrices to another motor drive. As an example, a second motor drive 40B determines the motion state for the corresponding link being controlled by the second motor drive and then transmits the second velocity matrix, $V_2$, and the second acceleration matrix, $\dot{V}_2$, to the third motor drive 40C. The second motor drive 40B transmits the second wrench matrix, $F_2$, to the first motor drive 40A. The final motor drive, $40_N$, has no subsequent motor drive to receive the velocity or acceleration matrices, but the final motor drive, $40_N$, will transmit its wrench matrix, $F_N$, to the immediately preceding motor drive. Transmission of the velocity matrix, $V_i$, acceleration matrix, $\dot{V}_i$, and wrench matrix, $F_i$, between adjacent motor drives 40 occurs over the inter-module communication interface 85. Preferably, communication occurs at an update rate coinciding with an update rate for the current regulator, such that the value of the dynamic torque, $T_D$, provided to the current regulator is updated each period of the current regulator. This rapid update rate requires a continuous, high bandwidth flow of data between the motor drives 40. The inter-module communication interface 85 may provide a dedicated communication channel to avoid overloading the bandwidth of the industrial network.

With reference again to FIG. 11, one motor drive 40 may be configured to control operation of two motors 45. The controller 120 and associated control loops 135 discussed above control operation of a single motor 45. When a motor drive 40 controls two motors, two sets of control loops 135 are executed, where each set of control loops 135 controls operation of a single motor 45. It is contemplated that a single processor 80 may execute both control loops. Optionally, separate processors 80 may execute in parallel or separate processing cores on a single processor execute in parallel. In any configuration, each motor 45 is controlled as a separate axis of the multi-axis control system 20.

When a motor drive 40 controls two motors 45, an extra efficiency in decoupling interaction between the axes may be achieved. As indicated above, one motor drive 40 controlling operation of a first axis determines a motion state for the link being controlled by that axis and transmits the velocity matrix, $V_i$, the acceleration matrix, $\dot{V}_i$, and the wrench matrix, $F_i$, to a motor drive for an adjacent axis via the inter-module communication interface 85. When two axes are being controlled by a single motor drive 40, the communication over the inter-module communication interface 85 may be reduced by one-half. Because the velocity matrix, $V_i$ and the acceleration matrix, $\dot{V}_i$, for the first link corresponding to the first axis controlled in the motor drive are utilized by the second axis controlled in the motor drive and because the wrench matrix, $F_i$, for the second link corresponding to the second axis controlled in the motor drive 40 is used by the first axis in the motor drive, these values do not need to be transmitted via the inter-module communication interface 85. Rather, these matrices may be shared between axes via internal memory within the motor drive 40. A portion of the memory 82 may be designated as shared memory with access provided to the controller 120 for each axis. The controller 120 of one axis writes to the shared memory and the controller 120 for the other axis reads from the shared memory. This eliminates communication delays between motor drives 40 for at least these two axes. If each motor drive 40 is configured to control two axes of the robot, R, the overall traffic between motor drives 40 for these decoupling terms is reduced by one-half.

In operation, the present invention distributes control of the multi-axis system between the industrial controller 30 and each motor drive 40. The industrial controller 30 uses the kinematic model 55 stored in memory 52 for the processor module 34 to determine position commands 121A for each axis of the multi-axis system. The industrial controller 30 may also generate full motion trajectories, where the full motion trajectory includes position commands 121A as well as feed forward commands 121B for velocity and/or acceleration. The industrial controller 30 transmits and the position commands or the motion trajectories to each motor drive 40.

The industrial controller 30 also distributes knowledge of the model for the robot, R, to each motor drive 40 such that each motor drive may compensate for disturbances experienced on a link controlled by the motor drive due to motion of other links in the robot. The industrial controller 30 divides the kinematic model 55 model on a per-axis basis and distributes each portion to each motor drive 40 controlling operation of a motor for one axis in the multi-axis control system. The portion of the kinematic model 55 and the parameters associated with a link of the robot, R, controlled by the axis are packaged into a configuration matrix 89 and transmitted to each motor drive 40. Each motor drive 40 utilizes the position commands, the information in the configuration matrix 89, as well as the matrices received from adjacent motor drives of the multi-axis system to control operation of the motor 45 connected to that motor drive. The multi-axis control system is described herein in terms of a robot. Further, a particular form of the kinematic model for the robot is discussed. The exemplary embodiment is illustrative and not intended to be limiting. Various embodiments of the invention may control the robot discussed herein as well as other forms of multi-axis control systems described by various different kinematic models.

The separate components of the kinematic model for each axis and the parameters associated with the link controlled by an axis are referred to herein as a configuration matrix 89 for the axis. Each configuration matrix includes data for ant axis to be controlled and knowledge of dynamic relationships between adjacent axes of the multi-axis control system. The configuration matrix 89 provides a distributed dynamic model of operation for each link controlled by the axis, where the distributed dynamic model is used by each motor drive 40 to improve control of a motor 45 in the multi-axis control system. The configuration matrix 89 includes, but is not limited to, physical parameters, reference frames for each axis, or information to translate between reference frames of different axes. The physical parameters of an axis may include properties such as the length of a link, the mass of link, the inertia of a link, or a location of the center of mass for the link. The reference frames and translation data may be defined by matrices of data.

Figure 12:
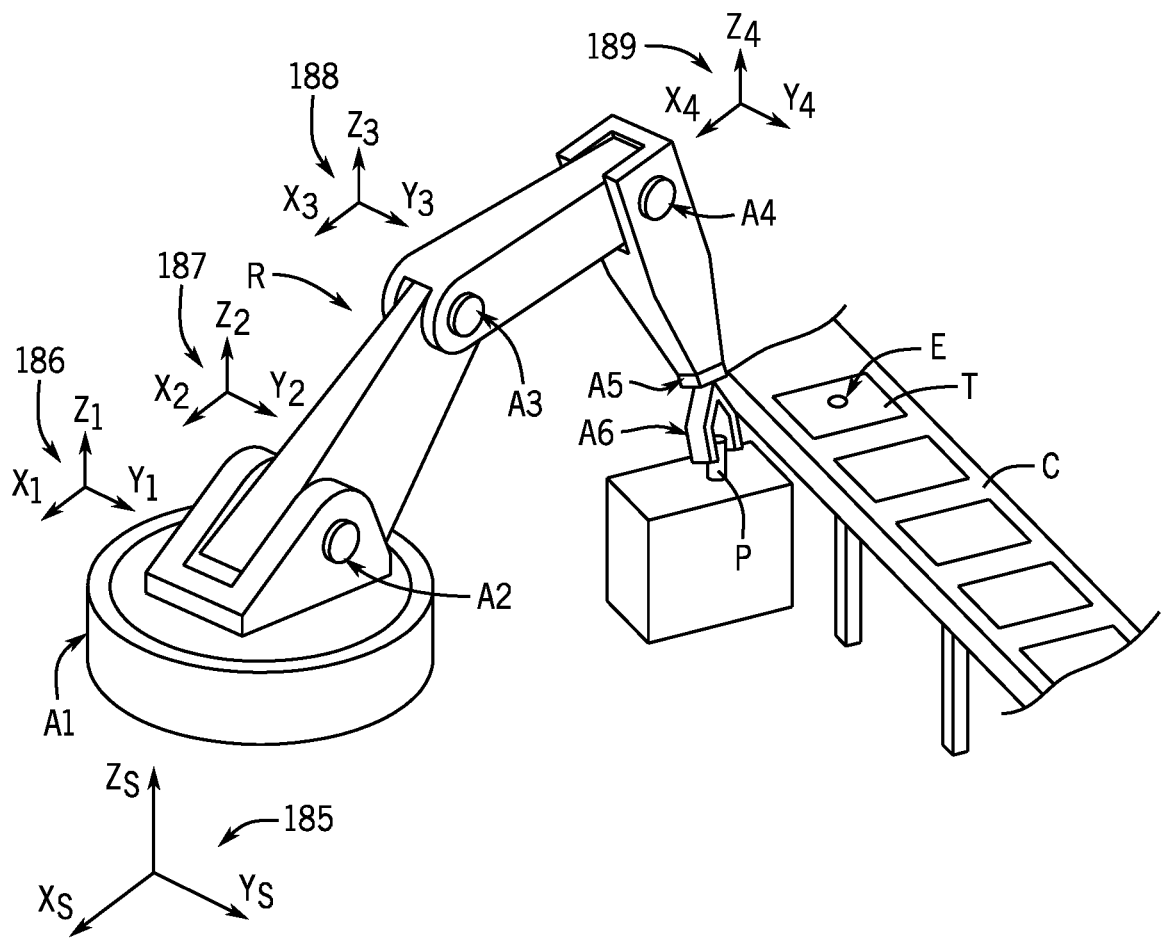
FIG. 12 is another exemplary environmental view of the robot of FIG. 1 interacting with a conveyor.
Figure 13:
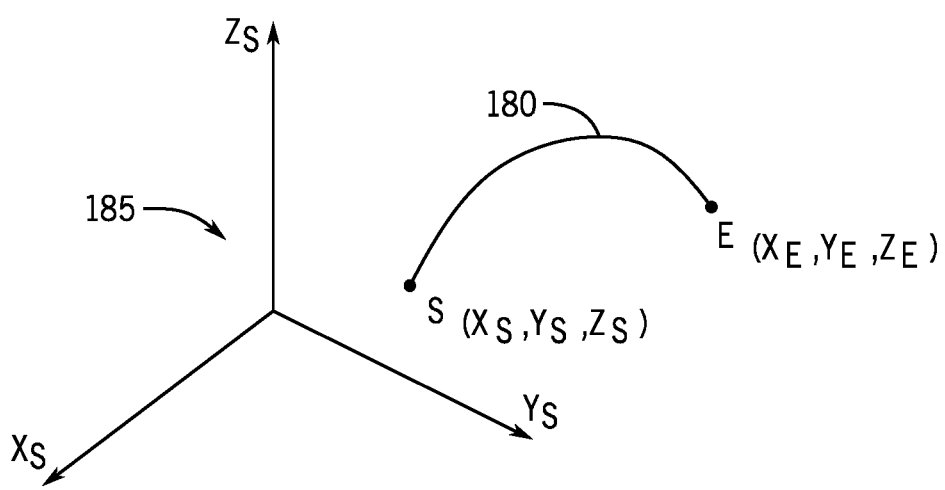
FIG. 13 is a graphical representation of a motion trajectory in a space reference frame.

With reference, for example to FIG. 12, the robot, R, is shown in an exemplary application where a product, P, is picked from a workstation and placed on tray, T, travelling along a conveyor, C, adjacent to the workstation. The location of the product, P, may define a starting point of a desired trajectory, and a location, E, on one of the trays, T, may define an ending point of the desired trajectory. With reference also to FIG. 13, and exemplary trajectory 180 in a space reference frame 185 is illustrated. The coordinates for the starting point, S, are defined as $(X_S, Y_S, Z_S)$ in terms of the x-axis, y-axis, and z-axis for the space reference frame 185. The coordinates for the ending point, E, are defined as $(X_E, Y_E, Z_E)$ in terms of the x-axis, y-axis, and z-axis for the space reference frame 185. The illustrated trajectory 180 defines desired motion of the end effector (i.e., the gripper) with the product, P, in the gripper. The trajectory includes an arc upward and then back downward, requiring motion in the z-axis, and also requiring motion in both the x-axis and y-axis to move from the start point, S, to the end point, E. While this trajectory 180 may be a relatively simple motion between two points, the trajectory 180 needs to be divided into motion for all six axes, A1-A6, of the robot, R, to cause the gripper to travel along the desired trajectory.

With reference again to FIG. 12, the space reference frame 185 is illustrated at an arbitrary location with respect to the robot, R. The origin of the space reference frame 185 may be defined once for the entire controlled process 20 or distinct space reference frames 185 may be defined at different locations, such as for each robot, R, operating in the controlled process. The origin may be set equal to one of the origins for an axis coordinate system, such as the coordinate system for the first axis, A1, to a location of the workpiece, or to any other desired location. The motor drive 40 for each axis controls operation of a motor that enables rotary motion about one of the axes, A1-A6, defined for the robot, R. A separate coordinate system for each axis is defined, with four of these coordinate systems illustrated in FIG. 12. A first axis coordinate system 186 is shown for the first axis, A1. The origin of the first axis coordinate system 186 may defined along the vertical axis about which the robot, R, will rotate. A second axis coordinate system 187 is shown for the second axis, A2. The origin of the second axis coordinate system 187 may defined along the axis of rotation for the first link of the robot where it is mounted to the first axis. Similarly, a third axis coordinate system 188 is shown for the third axis, A3, and a fourth axis coordinate system 189 is shown for the fourth axis, A4. Although not illustrated for ease of illustration, the fifth axis, A5, and the sixth axis, A6, similarly have a coordinate system defined for the respective axes. The origins of the third and fourth axis coordinate systems 188, 189 may defined along the axis of rotation for the second and third links of the robot where each link is mounted to a prior link. The industrial controller 30 receives the desired trajectory 180 in the space reference frame 185 and uses the kinematic model 55 to generate position commands, θ*, 121A or complete motion trajectories for each axis, A1-A6, in the coordinate system for the respective axis. The industrial controller 30 transmits the position commands, θ*, 121A and the feed forward commands, ωFF, αFF, 121B to each motor drive 40 for the axis controlled by the respective motor drive.

If each motor drive 40 controls the motor 45 for each axis, A1-A6, just based on the position command 121A and feed forward commands 121B received from the industrial controller 30, motion of one link induces disturbances in the other links in the robot, R. As previously discussed, motion in the first axis, A1, will result in motion in the links controlled by each subsequent axis, A2-A6, in the robot. Motion in the fourth axis, A4, will similarly result in motion in the links controlled by each subsequent axis, A5-A6, in the robot. Providing the velocity matrix, $V_i$, and acceleration matrix, $\dot{V}_i$, to each subsequent axis transmits information on the motion state from the prior link that may be used by the motor drive 40 controlling the adjacent link to compensate for the motion of a prior axis. Because each motor drive 40 transmits the velocity and acceleration matrices to the next adjacent motor drive, the motion for each prior link is incorporated into the motion state computed at the present link. Consequently, while motion of one link impacts each subsequent link, the velocity and acceleration matrices for each motor drive 40 do not need to be passed all the way along the chain of motor drives 40. Rather, the new velocity matrix, $V_i$, and the new acceleration matrix, $\dot{V}_i$, determined at each motor drive 40, incorporates the effects of each prior link and only a single set of matrices needs to be passed between adjacent motor drives 40 or between adjacent axis controllers 120 within a single motor drive.

Similarly, the torque applied to each axis, A1-A6, by each motor 45 will create a disturbance at another axis due to the mechanical linkages between axes. The wrench matrices, $F_i$, generated by the motor drive 40 in each axis will provide information on the torque required at each joint to achieve the commanded position or commanded motion trajectory. The wrench matrices are passed between adjacent drives in the inverse direction to the velocity and acceleration matrices. A new wrench matrix, $F_i$, is determined at each axis such that the effects of all of the prior axes are incorporated into the wench matrix passed between adjacent drive. Thus, only a single wrench matrix is passed between adjacent axes. The dynamics module 123 in each motor drive 40 uses the configuration matrix 89 to determine a new motion state for each link, which includes the velocity, acceleration, and wrench matrices, and, in turn, determines the value of the dynamic torque, $T_D$, for the corresponding axis controlled by that motor drive to compensate for the disturbances of coupled axes.

The dynamics module 123 determines the velocity matrix, $V_i$, and the acceleration matrix, $\dot{V}_i$, associated with the link being controlled as a function of the motion trajectory and the coupling effects of other links as described in the velocity and acceleration matrices received from each adjacent axis. The configuration matrix 89 defines relationships between links, at least in part, based on equations 1-3 below. Equation 1 first defines a translation matrix, where the translation matrix defines a relationship between the center of rotation of one joint with the center of rotation of an adjacent joint. The joints referenced are identified by the subscripts (i, i−1) of the translation matrix. The relationship between the two joints is defined by the offset between origins of the reference frames and by a rotation of each axis in one reference frame with respect to the other reference frame. Using the translation matrix, a vector in one reference frame may be converted to a vector in the other reference frame.

$$T_{i,i-1} = e^{-[A_i]\theta_i} M_{i,i-1} \tag{1}$$

where:
i is the ith joint;
i−1 is one joint prior to the ith joint;
θ is the angular position for the joint;
is a translation matrix between joint i−1 and joint i;
$e^{-[A_i]\theta_i}$ is the matrix exponential used to calculate the translation and rotation due to a change in joint angle; and
M is the robot home configuration matrix.

Having the translation matrix, the motor drive 40 is able to convert the effects of the velocity and acceleration matrices from a prior link into the reference frame for an axis, Ai, corresponding to an adjacent link. The effects of the velocity and acceleration matrices from the prior link and used with the effect of the commanded motion for the present link to determine a new motion state of the present link, where the new motion state includes the new velocity and acceleration matrices for the link controlled by the present axis. The velocity and acceleration matrices for the link controlled by the present axis, Ai, are determined as matrices, includes linear values ($x_i$, $y_i$, $z_i$) and rotational values ($Rx_i$, $Ry_i$, $Rz_i$) for the respective velocity and acceleration matrices.

$$V_i = Ad_{T_{i,i-1}}(V_{i-1}) + A_{si}\dot{\theta}_i \tag{2}$$

$$\dot{V}_i = Ad_{T_{i,i-1}}(\dot{V}_{i-1}) + ad_{v_i}(A_{si})\dot{\theta}_i + A_{si}\ddot{\theta}_i \tag{3}$$

where:

$\dot{\theta}$ is the angular velocity for the joint;
$\ddot{\theta}$ is the angular acceleration for the joint;
$V_i$ is the velocity matrix of a link connected to joint i;
$V_{i-1}$ is the velocity matrix of a link connected to joint i−1;
$\dot{V}_i$ is the acceleration matrix of the link connected to joint i;
$\dot{V}_{i-1}$ is the acceleration matrix of the link connected to joint i−1;
$A_{si}$ is the screw axis of joint i;
$Ad_{T_{i,i-1}}$ is the adjoint representation of the translation matrix; and
$ad_{v_i}$ is the adjoint representation of the velocity matrix.

As noted in the equations above, each motor drive 40 determines an acceleration and velocity matrix for the link being controlled as a function of both the commanded motion trajectory for the present axis and an acceleration and velocity matrix for the prior link coupled to link controlled by the present axis, Ai. Each motor drive 40 receives the velocity and acceleration from the motor drive 40 controlling the prior axis. As seen in FIG. 10, the velocity matrix, $V_i$, and the acceleration matrix, $\dot{V}_i$, from the motor drive 40 for the prior axis are communicated to the motor drive 40 for the adjacent axis via the inter-module communication interface 85.

Each motor drive 40 also determines a wrench matrix, $F_i$, associated with decoupling of the prior link's torque. The configuration matrix 89 further defines relationships between axes based on equations 4 and 5 below. Equation 4 determines the wrench matrix for a link connected to the present axis, Ai, as a function of the acceleration and velocity matrices of the link and as a function of the wrench matrix corresponding to a link connected to the next axis. Equation 5 then determines the dynamic torque, $T_D$, used by the controller 120 in the present axis to decouple the effects of the motion and forces applied to other links in the robot.

$$F_i = Ad_{T_{i+1,i}}^T(F_{i+1}) + G_i\dot{V}_i - ad_{v_i}^T(G_i V_i) \quad (4)$$

where:
$F_i$ is the wrench matrix on the link connected to joint i;
$F_{i+1}$ is the wrench on a link connected to joint i+1; and
$G_i$ is the inertia matrix of the link connected to joint i.

$$T_D = F_i^T A_i \quad (5)$$

where, $T_D$ is the torque on joint i.

As noted in equation 4, the motor drive 40 determines the force vector in part based on the operation of the link connected to the present axis and in part based on the wrench matrix associated with the link connected to the next axis. The first term in equation 4 corresponds to the force observed on the link connected to the present joint due to the forces experienced by each preceding link. The second term in equation 4 corresponds to forces observed on the link as a result of the acceleration of the link. The third term in equation 4 corresponds to forces observed on the link as a result of centripetal acceleration around each axis of the corresponding link. In some applications, one of the terms in equation 4 may dominate the disturbances experienced by a link. To reduce computational burden on a motor drive 40, individual terms within equation 4 may be selectively determined such that one, two, or all three terms within the equation may be incorporated into the wrench matrix. It may be desirable to only compensate for the effects of the dominant disturbance term to provide some improved performance without requiring the full computational burden at the motor drive 40. Each motor drive 40 receives the wrench matrix from the motor drive 40 controlling the next axis. As seen in FIG. 10, the wrench matrix, $F_i$, from the motor drive 40 for the next axis is communicated to the motor drive 40 for the adjacent axis via the inter-module communication interface 85.

After determining the velocity and acceleration matrices for the link connected to the present axis (as a function of the commanded motion trajectory and of the velocity and acceleration matrices received from a prior adjacent axis) and using the wrench matrix received from the next adjacent axis, each motor drive 40 determines a dynamic torque, $T_D$, required at the current joint to achieve the desired motion trajectory. This dynamic torque is provided to the control loops and used to determine the torque required to be output by the motor 45 of the present axis to achieve the desired motion trajectory. In some instances, the force observed at a joint from other joints may be sufficient for the present joint to achieve a desired motion trajectory and no additional torque needs to be output by the motor. In other instances, a joint may need to hold the current position, requiring no velocity or acceleration of the motor 45 for the current joint. However, the forces and torques observed at the joint from adjacent joints may be sufficient to cause motion of the joint. As a result, the motor drive 40 may need to generate counteracting torque to the forces and torques described in the wrench matrix received from the adjacent axis in order to hold the present join at the current position.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for distributed multi-axis motion control, the system comprising:
   a controller having a memory configured to store a control program and a processor configured to:
      execute the control program to determine a desired motion trajectory for a multi-axis system having a plurality of axes, and
      generate an axis command for each axis of the plurality of axes as a function of the desired motion trajectory;
   a plurality of motors, wherein each of the plurality of motors corresponds to one axis for the multi-axis system; and
   a plurality of motor drives, wherein:
      each of the plurality of motor drives controls at least one of the plurality of motors responsive to receiving the axis command for the corresponding motor, each of the plurality of motor drives determines a first motion state for a first link driven by the corresponding motor as a function of the axis command and of a portion of a second motion state for an adjacent axis, and each of the plurality of motor drives transmits at least a portion of the first motion state to another of the plurality of motor drives controlling the adjacent axis.

2. The system of claim 1, wherein the first motion state includes a velocity matrix and an acceleration matrix and wherein the velocity matrix and the acceleration matrix are transmitted to the other of the plurality of motor drives.

3. The system of claim 1, wherein the first motion state includes a wrench matrix and wherein the wrench matrix is transmitted to the other of the plurality of motor drives.

4. The system of claim 1, wherein:
the multi-axis system is a robot;
the robot includes a first axis, an end effector, and at least one intermediate axis;
the robot includes a plurality of links, wherein each of the plurality of links is between one of the first axis and the at least one intermediate axis, a first intermediate axis and a second intermediate axis, and the at least one intermediate axis and the end effector;
a first motor drive, selected from the plurality of motor drives, controls a first motor, selected from the plurality of motors, to control operation of the first axis;
a final motor drive, selected from the plurality of motor drives, controls a final motor, selected from the plurality of motors, to control operation of the end effector for the robot; and
each of the plurality of motor drives other than the first motor drive and the final motor drive control a motor for the at least one intermediate axis.

5. The system of claim 4, wherein:
the first motion state and the second motion state each include a velocity matrix, an acceleration matrix, and a wrench matrix;
each of the plurality of motor drives transmits the velocity matrix and the acceleration matrix to the motor drive for a subsequent axis; and
each of the plurality of motor drives transmits the wrench matrix to a motor drive for a prior axis.

6. The system of claim 1, wherein each of the plurality of motor drives includes an inter-module communication interface and wherein the portion of the first motion state is communicated between the motor drives via the inter-module communication interface.

7. The system of claim 1, wherein a first motor drive, selected from the plurality of motor drives, is configured to control a first motor and a second motor, where the first and second motors are selected from the plurality of motors.

8. The system of claim 7, wherein the first motor drive is configured to:
determine the first motion state of a first link controlled by the first motor as a function of a first axis command and of the second motion state;
determine the second motion state of a second link controlled by the second motor as a function of a second axis command and of the first motion state;
store each of the first motion state and the second motion state in a memory for the motor drive;
read the first motion state from the memory for determining the second motion state; and
read the second motion state from the memory for determining the first motion state.

9. The system of 1, wherein:
the memory for the controller is further configured to store a geometry of the multi-axis system,
the processor for the controller segments the geometry of the multi-axis system into a portion of the geometry for each axis of the multi-axis system, and
the processor for the controller transmits the portion of the geometry for each axis to the motor drive controlling the motor corresponding to the axis.

10. A method for distributed multi-axis motion control, the method comprising the steps of:
determining a plurality of axis commands within a controller as a function of a desired motion trajectory for a multi-axis system;
transmitting at least one of the plurality of axis commands to each of a plurality of motor drives, wherein each of the plurality of motor drives controls operation of a motor for an axis corresponding to the axis command;
determining a motion state for a link controlled by a first motor drive, selected from the plurality of motor drives, as a function of a first axis command received by the first motor drive;
transmitting at least a portion of the motion state from the first motor drive to a second motor drive; and
controlling operation of the axis corresponding to the second motor drive as a function of a second axis command received by the second motor drive and as a function of the portion of the motion state received from the first motor drive.

11. The method of claim 10 further comprising the steps of:
storing a geometry of the multi-axis system in a memory for the controller;
dividing the geometry of the multi-axis system into a portion of the geometry for each axis of the multi-axis system in the controller; and
transmitting the portion of the geometry for each axis to the motor drive controlling the motor corresponding to the axis, wherein the motion state for the link controlled by the motor drive is determined as a function of the portion of geometry received from the controller.

12. The method of claim 10, wherein the motion state includes a velocity matrix and an acceleration matrix and wherein the velocity matrix and the acceleration matrix are the portion of the motion state transmitted to the second motor drive.

13. The method of claim 10, wherein the motion state includes a wrench matrix and wherein the wrench matrix is the portion of the motion state transmitted to the second motor drive.

14. The method of claim 10, wherein:
the multi-axis system is a robot;
the robot includes a first axis, an end effector, and at least one intermediate axis;
the robot includes a plurality of links, wherein each of the plurality of links is between one of the first axis and the at least one intermediate axis, a first intermediate axis and a second intermediate axis, and the at least one intermediate axis and the end effector;
a first motor drive, selected from the plurality of motor drives, controls a first motor to control operation of the first axis for the robot;
a final motor drive, selected from the plurality of motor drives, controls a final motor to control operation of the end effector for the robot; and each of the plurality of motor drives other than the first motor drive and the final motor drive control a motor for the at least one intermediate axis.

15. The method of claim 14, wherein:

the motion state includes a velocity matrix, an acceleration matrix, and a wrench matrix;

each of the plurality of motor drives transmits the velocity matrix and the acceleration matrix for one axis to the motor drive for a subsequent axis between the first axis and the end effector; and each of the plurality of motor drives transmits the wrench matrix to a prior axis between the first axis and the end effector.

16. The method of claim 10, wherein:

the step of transmitting at least one of the plurality of axis commands to each of the plurality of motor drives includes transmitting a first axis command and a second axis command to a first motor drive;

the step of determining the motion state for the link controlled by a first motor drive determines the motion state for a first link and a second link, corresponding to a first axis and a second axis;

the step of transmitting at least the portion of the motion state from the first motor drive to the second motor drive includes storing the motion states for the first and second links in a memory of the motor drive;

the first motor drive is configured to control a first motor as a function of the first axis command and of the portion of the motion state for the second link stored in the memory; and the first motor drive is configured to control a second motor as a function of the second axis command and of the portion of the motion state for the first link stored in the memory.

17. A method for distributed multi-axis motion control, the method comprising the steps of:

determining a plurality of axis commands within a controller as a function of a desired motion trajectory for a multi-axis system;

determining a velocity matrix and an acceleration matrix at each axis as a function of the plurality of axis commands;

determining a wrench matrix in a second motor drive for a first motor drive;

transmitting the wrench matrix from the second motor drive to the first motor drive; and controlling operation of a first motor with the first motor drive as a function of the axis command for an axis controlled by the first motor and as a function of the wrench matrix received from the second motor drive.

18. The method of claim 17, wherein the velocity matrix and the acceleration matrix are determined in the controller.

19. The method of claim 17, wherein:

the first motor drive is configured to control the first motor for a first axis and a second motor for a second axis;

the first motor drive is further configured to determine the wrench matrix for the first axis as a function of the operation of the second motor.

20. The method of claim 17, further comprising the steps of:

storing a geometry of the multi-axis system in a memory for the controller;

in the controller, dividing the geometry of the multi-axis system into a first portion of the geometry for a first axis of the multi-axis system and into a second portion of the geometry for a second axis of the multi-axis system;

transmitting the first portion of the geometry to the first motor drive; and transmitting the second portion of the geometry to the second motor drive, wherein the wrench matrix is determined as a function of the second portion of the geometry received from the controller.

* * * * *